United States Patent
Brox (10) Patent No.: US 7,813,497 B2
(45) Date of Patent: Oct. 12, 2010

(54) ECHO CANCELLER WITH INTERFERENCE-LEVEL CONTROLLED STEP SIZE

(75) Inventor: Wolfgang Brox, Kalchreuth (DE)

(73) Assignee: ST-Ericsson SA, Plan-les-Ouates (CH)

( * ) Notice: Subject to any disclaimer, the term of this patent is extended or adjusted under 35 U.S.C. 154(b) by 1108 days.

(21) Appl. No.: 10/587,965

(22) PCT Filed: Jan. 20, 2005

(86) PCT No.: PCT/IB2005/050236

§ 371 (c)(1),
(2), (4) Date: Jul. 31, 2006

(87) PCT Pub. No.: WO2005/074156

PCT Pub. Date: Aug. 11, 2005

(65) Prior Publication Data

US 2009/0022074 A1 Jan. 22, 2009

(30) Foreign Application Priority Data

Jan. 29, 2004 (EP) ................................ 04100326

(51) Int. Cl.
*H04M 9/08* (2006.01)
(52) U.S. Cl. .......................... 379/406.08; 379/406.11; 381/71.11; 381/318
(58) Field of Classification Search ................. 370/286, 370/289; 379/406.01, 406.08, 406.11–406.16; 381/71.11, 318
See application file for complete search history.

(56) References Cited

U.S. PATENT DOCUMENTS

| | | | |
|---|---|---|---|
| 5,606,550 A | 2/1997 | Jangi | |
| 5,734,715 A | 3/1998 | Scalart et al. | |
| 5,960,077 A | 9/1999 | Ishii et al. | |
| 2004/0001450 A1* | 1/2004 | He et al. | 370/286 |

FOREIGN PATENT DOCUMENTS

| | | |
|---|---|---|
| EP | 1 714 398 B1 | 3/2009 |
| FR | 2 738 695 | 3/1997 |
| FR | 2 748 184 | 10/1997 |
| GB | 2 075 313 | 11/1981 |

* cited by examiner

*Primary Examiner*—Fan Tsang
*Assistant Examiner*—Simon King
(74) *Attorney, Agent, or Firm*—Timothy L. Boller; Seed IP Law Group PLLC (57) ABSTRACT

Echo canceling method comprising the steps: a) receiving a first signal and a second signal, said second signal comprising an echo of the first signal, b) generating an echo replica signal by filtering the first signal with a finite impulse response filter, said finite impulse filter using a filter coefficient vector for generating the echo replica signal, generating an echo cancelled signal by subtracting the echo replica signal from the second signal, d) determining a measure of interference within the second signal, e) determining a step vector depending on said measure of interference, wherein increasing the measure of interference continuously reduces a size of the step vector, and f) updating the filter coefficient vector by the step vector.

26 Claims, 7 Drawing Sheets

ECHO CANCELLER WITH INTERFERENCE-LEVEL CONTROLLED STEP SIZE

The present invention relates to an echo canceling method and an echo canceling device.

Perceptible echoes are always present in telecommunication systems, if a coupling exists between the receive path and the transmit path of a subscriber line. Because of the coupling, the received signal of one subscriber is transmitted back to the other subscriber and thus causes an echo, i.e. the other subscriber notices a delayed version of his own signal. The perceptibility of the communication is strongly degraded by the echo, particularly if the delay is high. Therefore, it is desirable to provide a method and device, which automatically cancel echoes locally.

Due to a different way of echo generation we can distinguish between acoustic echoes and electric echoes. Acoustic echoes arise from an acoustic coupling between loudspeaker and microphone of the actual telecommunication terminal, such as hands-free telephone sets for teleconference systems or videoconference systems. Electric echoes are generated in so-called '2/4-wire' hybrid circuits, which realize the connection between one subscriber terminal, e.g. a base-station of a cordless telephone system and the two-wire telephone line. Due to technical reasons, these hybrid circuits are not able to provide a perfect separation of the transmit path and the receive path. Therefore, part of the transmitted signal leaks into the receive path and represents an electric line echo.

Figure 1:
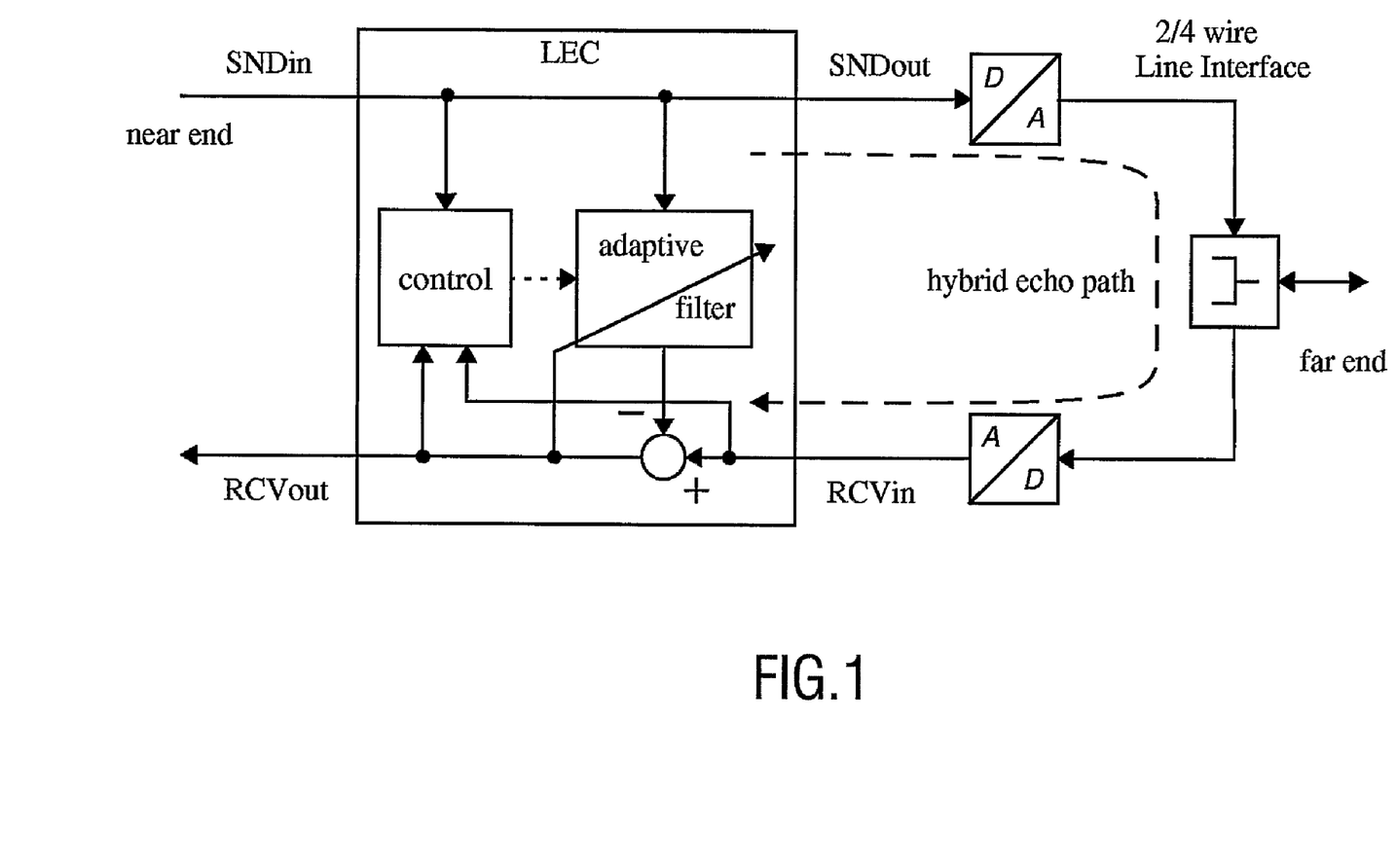
FIG. 1 shows a conventional implementation of a line echo-canceling device.

FIG. 1 shows a line echo canceller (LEC) according to the state of the art. The line echo canceller LEC is adapted to cancel echoes caused by a hybrid impedance mismatch in a 2/4-wire line interface.

Figure 2:
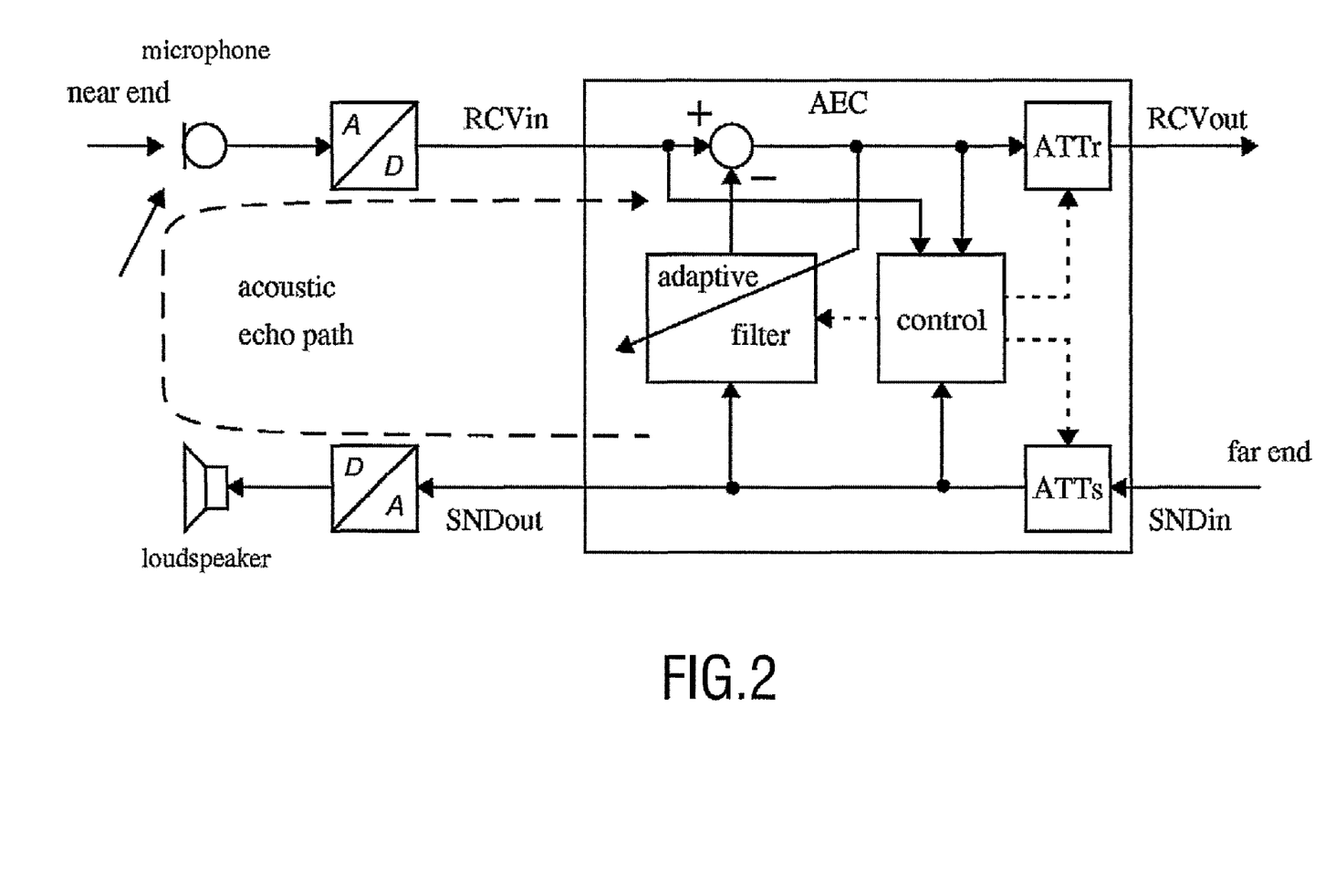
FIG. 2 shows an acoustic echo-canceling device.

FIG. 2 shows an acoustic echo canceller (AEC) according to the state of the art. An acoustic signal generated by a loudspeaker is reflected to a microphone via an acoustic echo path. The task of the acoustic echo canceller AEC is to suppress the signal reflected into the microphone.

Both echo cancellers comprises an adaptive filter as well as a control circuit. The adaptive filter has to match the echo between two nodes SNDout and RCVin. SNDin constitutes the reference signal from which the echo signal is originated. The reference signal is fed into the echo canceller. The signal output from the echo canceller is called SNDout. The above convention for signal naming should avoid the confusion with the often-used notions 'far end signal' and 'near end signal'.

A digital/analogue-converter (D/A-converter) converts the digital signal SNDout into an analogue signal which is partly reflected via the echo path into the receive path. An analogue/digital-converter (A/D-converter) converts the receive signal from the other party including the echo signal into a digital signal called RCVin. The adaptive filter has to generate a signal, which corresponds to the echo signal contained in RCVin. A subtractor (+/−) subtracts the signal generated by the adaptive filter from the signal RCVin. Consequently a signal RCVout with only residual echo constituents is generated. This error signal is used to improve the performance of the adaptive filter and change the filter in response. The control unit tracks all signals of the echo canceller nodes and derives further control signals (short dashed lines in FIG. 1 and FIG. 2) to influence the adaptation process in speed or even control an attenuation-switch, following the adaptive filter in the case of an acoustic echo canceller. These additional measures can be necessary for acoustic echo canceling since the required high filter order of the adaptive filter (note, that the reverberation time of the room acoustic is typically in the range from 20 to 200 milliseconds) has to be constrained to a maximum to keep the effort within reasonable limits.

Conventionally, a finite impulse response filter (FIR-filter) is used as an adaptive filter. The FIR-filter is described by the convolution of an input reference signal vector $\vec{x}$ with a coefficient vector $\vec{h}$. The input signal is sampled for a certain number of consecutive input values. These values constitute the input reference signal vector $\vec{x}$.

The signal output by the FIR-filter is computed in the following way:

$$Y = \vec{h}^T \cdot \vec{x} \quad (1)$$

Y represents a scalar. Y is output successively at different points in time k. Therefore, equation 1 may be rewritten in the following form:

$$Y(k) = \vec{h}(k)^T \cdot \vec{x}(k) \quad (2)$$

The filter coefficient vector $\vec{h}(k)$ in each sample period k is continuously updated by a vector increment $\Delta\vec{h}(k)$. The general adaptation equation is:

$$\vec{h}(k+1) = \vec{h}(k) + \Delta\vec{h}(k) \quad (3)$$

The norm $\|\Delta\vec{h}\|$ of the step vector $\Delta\vec{h}$ determines the stability and adaptation speed of the algorithm. The most popular used and representative adaptation algorithm is the method of the steepest decent. The direction of the step vector corresponds to the actual negative gradient of a squared error signal. The optimum coefficient vector is reached, if the gradient of the mean squared error signal is 0, i.e. the mean squared error signal reaches a minimum. The normalized least mean square algorithm (NLMS-algorithm) is defined by the following equation:

$$\Delta\vec{h}(k) = e(k) \cdot \frac{1}{\|\vec{x}(k)\|^2} \cdot \vec{x}(k) \quad (4)$$

e(k) represents the actual error between echo and filter output (echo replica) at the point in time k. The normalization, i.e. division by $\|\vec{x}(k)\|^2$, removes the dependency of the step vector $\Delta\vec{h}$ from the power of the input reference signal.

The error signal e(k) after the subtraction circuit (+/−) corresponds to the output signal RCVout. The error signal e(k) corresponds to the residual echo signal in the absence of any interference. This assumes that the signal RCVin contains exclusively the echo signal. If the input signal RCVin is a superimposition of the echo signal and a further signal, then the error signal e(k) is not a correct replica of the error of the FIR-filter. The common expression for this situation is "Double talk".

In the acoustic echo canceller AEC of FIG. 2 a superimposition of the echo signal and a further noise signal occurs, if i.e. a person speaks into the microphone, while the loudspeaker is generating sound. The signal input into the microphone is a superimposition of the echo signal and the voice of the speaker. The adaptation of the filter coefficient vector $\vec{h}$ must be suppressed during double talk. The echo replica filter (FIR-filter) operates during a double talk situation, but the filter coefficient vector $\vec{h}$ is not updated during double talk. If the echo characteristics (the echo path) do not change during double talk, then the output of the FIR-filter is a good representation of the echo signal. The echo signal may be subtracted from the input signal constituting a superimposition of the echo signal and the interference-speaker. The voice signal of the speaker would not be deteriorated significantly in this case.

Figure 3:
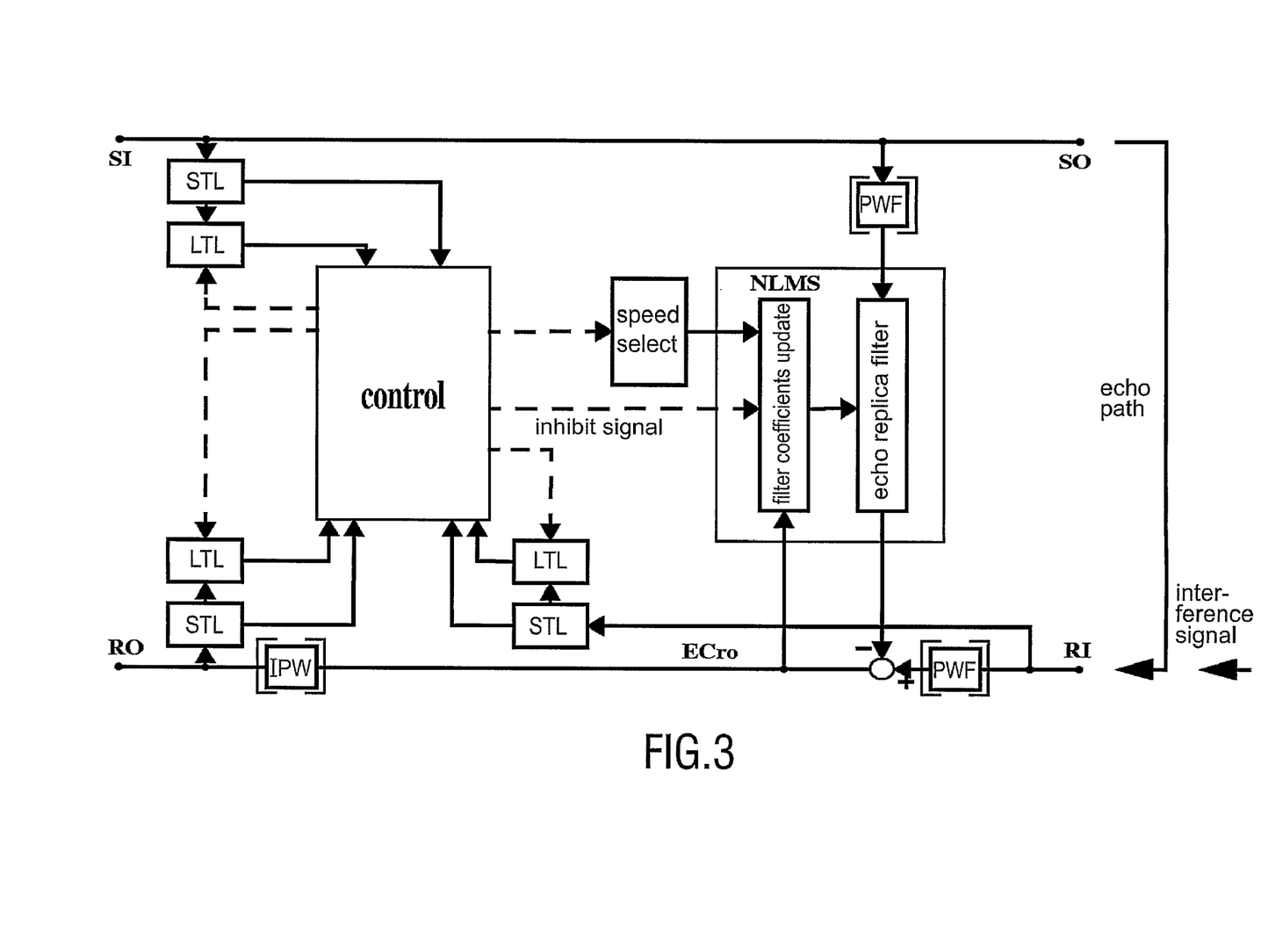
FIG. 3 shows a further echo canceller according to the state of the art.

FIG. 3 shows a conventional echo canceller, which provides a signal for the inhibition of an update of the filter coefficient vector during double talk. The FIR-filter is called echo replica filter in FIG. 3. The means for updating the filter coefficient vector is called filter coefficient update in FIG. 3. NLMS stands for normalized least mean square algorithm. This is the algorithm presented in the previous paragraph. SI stands for signal input and SO stands for signal output. The output signal may be assumed to be output by a loudspeaker by SO. A microphone may be assumed to record the input signal RI. The input signal RI is a superposition of the echo signal and a disturbing interference signal. PWF stands for prewhitening filter. The filter PWF is merely optional and the functioning of the echo canceller may be explained without reference to the prewhitening filter PWF. IPW stands for inverse prewhitening filter.

The signal input SI is presented to the echo replica filter (FIR-filter) via the prewhitening filter, the effect of which may be neglected now. The echo replica filter (FIR-filter) generates an echo replica, i.e. an output signal, which is subtracted from the signal RI. The resulting signal is RO. RO should converge to zero, if the echo replica is correct and no disturbing interference signal is superimposed on RI. A control circuit is provided, which inhibits the filter coefficient update, whenever double talk is detected. Y(k) is the output sample at time instant k of the echo replica filter. SI(k) is the reference signal input sample to the echo replica filter. The output of the echo replica filter is equal to:

$$Y(k) = \vec{h}(k)^T \cdot \vec{SI}(k) = \sum_{i=0}^{N-1} h(i) \cdot SI(k-i) \quad (5)$$

The constant N corresponds to the number of coefficients respective the filter length of the FIR-filter. The signal output by the subtracting circuit (+/−) in FIG. 3 is equal to the error signal RO(k)

$$RO(k)=RI(k)-Y(k) \quad (6)$$

The step vector $\Delta\vec{h}$ is determined by the following equation:

$$\Delta\vec{h}(k) = \alpha(m) \cdot RO(k) \cdot \frac{1}{\|\vec{SI}(k)\|^2} \cdot \vec{SI}(k) \quad (7)$$

α is a control parameter, which is used to control the adaptation speed within the range of stability predetermined by the implemented algorithm. In case of the algorithm presented by equations (5) through (7) α must lie in the range of 0 to 2. A separate control algorithm steers the control parameter α, where m is a sub-sampled time index with respect to the normal time index k (sampling rate).

The signals SI, RI and RO are lead via circuits STL and LTL to the control circuit, which do level calculations with different time resolution. The circuits STL perform a short-term leaky integration of the magnitude of the input signals SI, RI and RO respectively. The circuits LTL perform a long-term leaky integration of their input signals, and are additionally controlled via internal states of a control block.

Integration of a signal for a predetermined period of time may be performed by averaging the signal within this time window. If the signal values preceding or following the time window should not contribute to the average, the filtering or convolution is done by a filter function having the value 1 for the predetermined period of time and having the value 0 otherwise. But other functions than the above discussed box function can be used as well.

In the analogue world an operator for leaky integration of the magnitude of a signal x(t) may be defined as $$L\_x(t) = \int_0^\infty |x(t-\tau)| \cdot e^{-\alpha\tau} d\tau \quad (8)$$

As α approaches 0 the leaky integration becomes a regular integration of |x(t)|. $e^{-\alpha\tau}$ has the effect, that values of |x(t)|, which lie far in the past do not significantly contribute to the integral. The difference between the long-term and the short-term leaky integration is determined simply by different values of α. A short-term leaky integration has a large value for α. Only recent values of x(t) contribute to the integral.

In the discrete world, the leaky integration leads to the recursion scheme $$L\_x(k)=(1-\beta)\cdot L\_x(k-1)+\beta\cdot|x(k)| \quad (9)$$

x may be the signal SI, RI or RO in FIG. 3. Long-term levels LL_SI, LL_RI and LL_RO represent the long-term leaky integration of signal SI, RI and RO, respectively. Short-term levels L_SI, L_RI and L_RO represent the short-term leaky integration of signals SI, RI and RO, respectively. Instead of leaky integrating the absolute value of samples x(k) (magnitude level) the squared samples $x^2(k)$ may be leaky integrated (power level). The control circuit of the local echo canceller shown in FIG. 3 detects a double talk situation in two circumstances. A first double talk situation is detected, if following equation holds:

$$L\_SI(k)<L\_RI(k)\cdot DBL\_TH1 \quad (10)$$

The interpretation is as follows: If the level L_RI is greater than a worst case echo level generated form signal level L_SI along the echo path, then an indication for the first double talk situation is marked. Consequently, the filter coefficient update is stopped.

A second detection of a double talk situation is carried out by the following equation:

$$\frac{L\_RI(k)}{L\_RO(k)} < \frac{LL\_RI(m)}{LL\_RO(m)} \cdot DBL\_TH2. \quad (11)$$

The interpretation is as follows: If the short-term level ratio $$\frac{L\_RI(k)}{L\_RO(k)},$$

which is the current attenuation between signal RI and RO, is less then the long-term level ratio $$\frac{LL\_RI(m)}{LL\_RO(m)},$$

which should be a reliable estimation of the echo attenuation achieved by the adaptive filter, then an indication for the second double talk situation is marked. Consequently, the filter adaptation is also inhibited.

If only the second double talk situation holds on for a longer time instant, and there is an active signal SI, the probability for an echo path change rather then a real double talk situation is given. This assumes, that long double talk is an exception rather than a rule. After a predetermined time period (timeout), the filter update is resumed, even though the second double talk situation holds on. Instead, a change in the echo path system is assumed. The long-term level LL_RI(m) and LL_RO(m) are reset to the current short-term levels L_RI(k) and L_RO(k), since the estimated echo attenuations are not reliable anymore.

The algorithm for detecting a double talk situation according to the state of the art has several drawbacks. If a double talk situation is detected too late, then the filter coefficient vector $\bar{h}$ is changed for a considerable amount of time on the basis of an error signal, which is simply wrong. The filter coefficient is deteriorated until the update is blocked. In case of double talk, the echo attenuation or echo cancellation is then very bad. Furthermore, the update of the filter coefficient vector $\bar{h}$ may be blocked, even though a double talk situation is not present anymore. In this situation, an improvement of the filter coefficient vector is not performed although it would be desirable. The algorithms for detecting a double talk situation are not 100% reliable and therefore the adaptation of the filter coefficient is often carried out erroneously with the effect of bad quality and intelligibility on the speech communication.

It is an object of the invention to provide an echo canceling method and a corresponding echo canceling device, which overcomes the drawbacks of the state of the art.

The problem is solved by an echo canceling method comprising the steps of a) receiving a first signal and a second signal, said second signal comprising an echo of the first signal, b) generating an echo replica signal by filtering the first signal with a finite impulse response filter, said finite impulse filter using a filter coefficient vector for generating the echo replica signal, c) generating an echo cancelled signal by subtracting the echo replica signal from the second signal, d) determining a measure of interference within the second signal, e) determining a step vector depending on said measure of interference, wherein increasing the measure of interference continuously reduces a size of the step vector, and f) updating the filter coefficient vector $\bar{h}(k)$ by the step vector.

The decisive difference between the method according to the state of the art and the method of the present invention is the fact, that the adaptation of the filter coefficient vector $\bar{h}$ is not stopped, if a double talk condition is detected. Instead a measure of interference is determined. The measure of interference may be regarded as representing the probability for a double talk situation. The value of the measure of interference is high, if double talk is likely, and low, if double talk is not likely. The adaptation of the filter coefficient vector $\bar{h}$ is continuously performed but slowed down depending upon the likelihood of a double talk situation. An increase in the measure of interference automatically reduces the size of the step vector. The adaptation is not halted (hard switching), if a threshold value is reached, but continuously slowed down (soft control). A sudden rise of the echo cancelled signal level may for example be used as an indication for the presence of interference. But instead of providing a threshold value for comparison and stopping the adaptation as a whole, the method of the present invention continuously reduces the size of the step vector depending on the measure of interference. Consequently, the adaptation process as a whole reacts to an increased measure of interference, before a threshold value is reached. A strong deterioration of the echo canceling performance does not occur due to a too lately detected double talk situation.

In principle the size of the step vector is reduced, if the measure of the interference increases, and the size of the step vector is increased, if the measure of interference decreases. The increase of the step vector however is preferably limited by an upper boundary, which guarantees adaptation stability. The adaptation speed is thereby slowed down during a high level of interference and increased during a low level of interference. The changes to the coefficient vector $\bar{h}$ should be minimal during double talk situations, such that the echo cancellation is not deteriorated strongly.

Preferably the step vector is determined by generating a first step vector adapted to improve the filter coefficient vector, as if the second signal would not be affected by interference, by generating a second step vector depending on said measure of interference, and by selecting the step vector from the first and second step vector, wherein the step vector having the smallest size is chosen.

The generation of the first step vector may be performed according to the conventional NLMS-algorithm. The generation of the second step vector takes into account the measure of interference. The second step vector continually decreases, if the measure of interference increases. Therefore, the second step vector is smaller than the first step vector, if the likelihood for double talk is high. Since the resultant step vector corresponds to the smaller one of the first and second step vector, the step vector is continually reduced depending on the increased measure of interference. Conversely a decreased measure of interference increases the second step vector with the risk of a too high adaptation speed, but by using again the smaller one of the first and second step vector the stability of the adaptation is guaranteed.

If the second step vector would also be significantly smaller than the first step vector, even though there is no interference signal, then the adaptation speed of the filter coefficient vector would be significantly deteriorated. Therefore, the second step vector is preferably determined in such a way, that it should substantially correspond to the first step vector in the absence of any interference within the second signal.

The measure of interference may be determined depending on a level of the echo cancelled signal. If the echo replica signal corresponds well to the echo of the first signal, then a high level of the echo-cancelled signal is an indication for interference within the second signal. A level calculation for a particular point in time results from integration of the magnitude of signal samples (magnitude level) or of squared signal samples (power level) within a time window. By doing this calculation continuously in time a smoothing or low-pass filtering process to the magnitude or squared signal samples is applied. The filtering can be done using e.g. a FIR rectangular window function (normal short-term integration) or an IIR exponential window function (leaky short-term integration according to equation 9). At a sampling rate of 8 kHz the factor $\beta$ in equation (9) can be in the range of $2^{-5}$ to $2^{-7}$ which means a time constant of about 4 to 16 milliseconds. Preferably the time constant for the short-term level leaky integration should cover the time window of the echo path impulse response.

Preferably the measure of interference is also determined using an overall or total echo return loss ($ERL_T$), which comprises the echo return loss of the echo path (ERL) as well as the echo return loss enhancement (ERLE) of the echo canceller. A high echo return loss enhancement is indicative of a well performing echo canceller. In the absence of interference the adaptation algorithm should converge fast resulting in a high ERLE value. A high ERLE value should then further reduce the size of the step vector, if afterwards interference is present.

The estimations of the echo return losses may be determined by long-term level ratios of two signals at a time, e.g. the echo return loss of the echo path by the long-term level ratio of the first signal and the second signal, the echo return loss enhancement by the long-term level ratio of the second signal and the echo cancelled signal and the overall or total echo return loss by the long-term level ratio of the first signal and the echo cancelled signal. Preferably the estimations of echo return losses are determined depending on whether double talk situations are present or not. During double talk the echo cancelled signal predominantly consists of the double talk interferer, if the echo cancellation performs well. Therefore, the ratios are not representative for echo attenuations in case of double talk. It is preferable to inhibit as far as possible the determination of the echo return losses directly from the corresponding long-term levels during double talk. To this end double talk is detected and the calculation of echo return losses is inhibited in response. To go one step further, estimations of echo return loss calculations are modified during the different states of double talk with special leakage factors to pull or drive the estimations into a direction of lower echo attenuation to avoid a long blocking of re-adaptation in case of system changes which pretend double talk situations.

The short-term level of the echo cancelled signal as well as the total echo return loss may be used both simultaneously in order to determine the measure of interference. Preferably the measure of interference is proportional to the short-term level of the echo-cancelled signal multiplied by the total echo return loss. An additional squaring of the measure of interference is performed, if all level calculations are done depending on the magnitude of signal samples. This can be skipped, if power level calculations depending on squared signal samples are chosen. In this spirit the squaring of the measure of interference is a transformation (adapter) to get same units for the size of first and second step vector.

A sudden rise in the echo-cancelled signal level will quickly slow down the adaptation of the filter coefficient. This effect becomes now more and more stronger with the actual reached echo attenuation. This means that the process of automated controlling of double talk situations works quicker and more reliable the better the filter attenuates the echo. Just in this case one could loose a lot of attenuation if double talk controlling fails and the filter vector deteriorates. Nevertheless a good starting point in double talk controlling performance is already reached by a minimum overall or total echo loss of e.g. 6 dB.

Preferred embodiments of the present invention will be described herein after with reference to the accompanied drawings.

Figure 4:
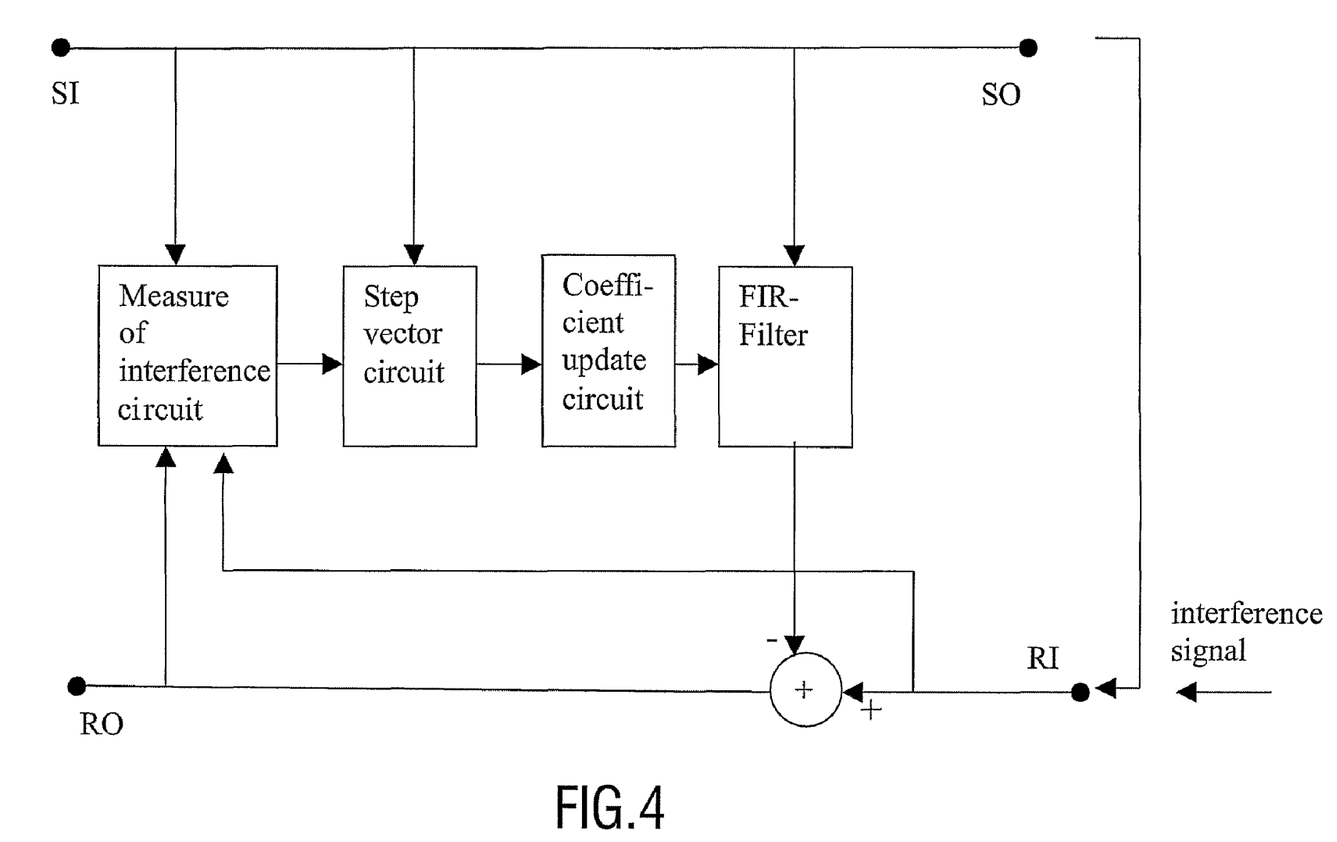
FIG. 4 shows a first embodiment of the echo-canceling device according to the present invention.

The echo-canceling device of FIG. 4 comprises a finite impulse response filter (FIR-filter), a subtraction circuit (⊕), a coefficient update circuit, a means for determining a step vector $\Delta\vec{h}$ (step vector circuit) and an interference measure circuit. The FIR-filter receives a reference signal SI, which is output at a node SO and reflected via an echo path to a node RI. The signal RI constitutes a superimposition of an echo signal and an interference signal, which disturbs the adaptation process. The task of the FIR-filter and the subtraction circuit is to cancel the echo signal within the signal RI, but ignore the interference signal. The output of the subtraction circuit is an echo-cancelled signal RO. The FIR-filter has the reference signal SI as input and outputs signal Y. The echo replica signal Y is calculated by the equation:

$$Y = \vec{h}^T \cdot \vec{SI} \quad (12)$$

If no interference signal is present, the echo replica signal Y converges and represents the echo signal. The echo-cancelled signal RO should approach 0. The echo cancelled signal RO is input to the interference measure circuit, which also receives the signal SI. The measure of interference circuit calculates a measure of interference by comparing the signal SI with the echo-cancelled signal RO. The measure of interference indicates how strong the echo cancelled signal RO is influenced by the interference signal. The calculated measure of interference is output to the step vector circuit for calculating a step vector $\Delta\vec{h}$. The step vector $\Delta\vec{h}$ is gradually reduced, if the measure of interference increases. Therefore, the adaptation of the filter coefficient vector is slowed down, if the measure of interference is high. The step vector $\Delta\vec{h}$ is output to the coefficient update circuit. The coefficient update circuit calculates the filter coefficient vector $\vec{h}$ and outputs the new filter coefficient vector $\vec{h}$ to the FIR-filter. The FIR-filter calculates in return the next value for Y using the new filter coefficient vector $\vec{h}$. A new coefficient vector $\vec{h}$ is equal to $\vec{h} + \Delta\vec{h}$.

Figure 5:
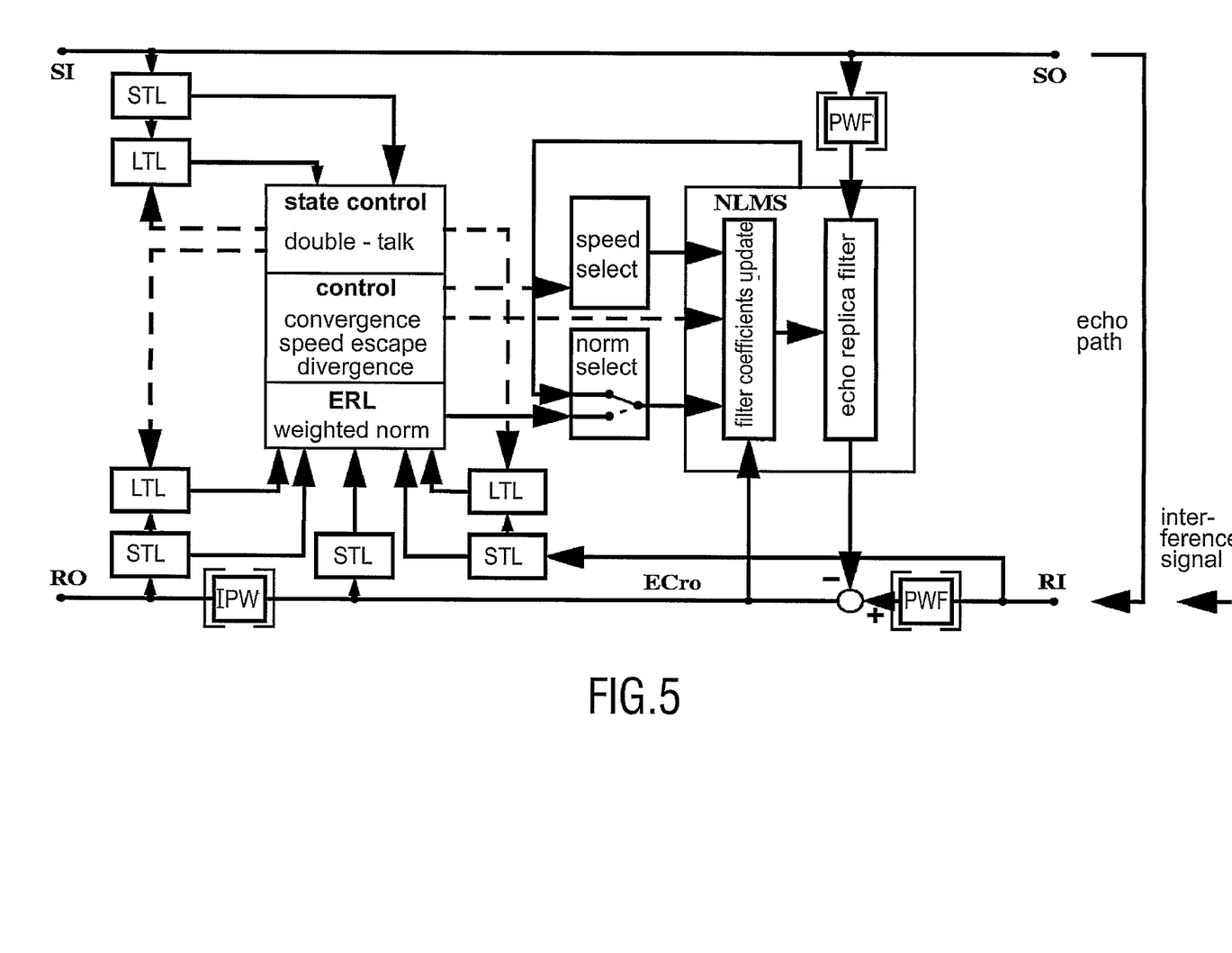
FIG. 5 shows a second embodiment of the echo-canceling device according to the present invention.

FIG. 5 shows the second embodiment of the present invention. An echo replica filter in FIG. 5 corresponds to the FIR-filter in FIG. 4. The filter coefficient update circuit corresponds to the step vector circuit and the coefficient update circuit in FIG. 4 taken together. The interference level circuit in FIG. 4 corresponds to an ERL-circuit and a norm select-circuit in FIG. 5. The echo replica filter in FIG. 5 receives the reference signal SI via a pre-whitening filter PWF. The pre-whitening filter is a pre-emphasis filter, which lifts up higher spectral parts of a speech signal, in order to improve the overall convergence behavior of the echo-canceling device. It is well known, that echo canceling algorithms perform better on training signals with a flat spectrum (for example white noise) and it is good practice to lift up spectral gaps of a given training signal. The output of the pre-whitening filter and its behavior may be explained by the following equation:

$$PWF(k) = \frac{g}{a} \cdot [x(k) + (a-1) \cdot x(k-1)] \quad (13)$$

The constant a is the filter coefficient and g is the gain factor of the pre-whitening filter. x is the signal input to the pre-whitening filter and PWF is the output of the pre-whitening filter. The PWF-filter improves the performance of the filter coefficient update process in FIG. 5, but it is not a necessary component. The PWF-filter is provided at the input of the echo replica filter and the echo signal RI is also filtered using a pre-whitening filter. Furthermore, an inverse pre-whitening filter IPW is provided in the circuit of FIG. 5. The inverse pre-whitening filter IPW may be described by the following equation:

$$IPW(k) = (1-a) \cdot IPW(k-1) + \frac{a}{g} \cdot x(k) \quad (14)$$

The echo-cancelled signal is sent through the inverse pre-whitening filter, in order to remove the effects of the pre-whitening filters on the echo cancelled signal.

The echo-canceling device of FIG. 5 further comprises several short-term level leaky integration filters STL. The signals SI, RO and RI are sent to the short-term level leaky integration filters STL. The behavior of these filters may be described by the following equation:

$$L\_x(k) = \{L\_x(k-1) + \beta_{LP} \cdot [|x(k)| - L\_x(k-1)] \text{ if } [|x(k)| - L\_x(k-1)] > 0$$

$$L\_x(k) = \{\{L\_x(k-1) + \beta_{LH} \cdot [|x(k)| - L\_x(k-1)]\} \quad (15)$$

Otherwise x represents in the above equation the input to the short-term level leaky integration filters, therefore, x may be equal to SI, RI or RO depending on which filter is regarded. Depending on a rising or a falling edge in the input signal level, a different constant β is used for calculating the output of the STL-filter. $\beta_{LP}$ is used, if the current input signal is higher than the previous output value of the STL-filter. The different setting of the time constant parameter β is used to place particular emphasis on the onset of a speech signal. Furthermore, FIG. 5 comprises several long-term leaky integration filters LTL. The output of the LTL-filters is calculated in a decimated rate by the following equations:

$$LL\_SI(m) = \begin{cases} LL\_SI(m-1) + \beta_{LL} \cdot [L\_SI(m) - LL\_SI(m-1)] & \text{if} \quad \text{state} => \text{adaptation} < \\ LL\_SI(m-1) + \beta_{LLK1} \cdot [L\_SI(m) - LL\_SI(m-1)] & \text{elseif} \quad \text{state} => \text{DBL\_1st} < \\ LL\_SI(m-1) + \beta_{LLK2} \cdot [L\_SI(m) - LL\_SI(m-1)] & \text{elseif} \quad \text{state} => \text{DBL\_2nd} < \\ LL\_SI(m-1) & \text{else} \quad \text{state} => \text{SI\_inactive} < \end{cases} \quad (16)$$

$$LL\_RI(m) = \begin{cases} LL\_RI(m-1) + \beta_{LL} \cdot [L\_RI(m) - LL\_RI(m-1)] & \text{if} \quad \text{state} => \text{adaptation} < \\ LL\_RI(m-1) + \beta_{LLK1} \cdot \left[\frac{\min(L\_RI(m), L\_SI(m)) -}{LL\_RI(m-1)}\right] & \text{elseif} \quad \text{state} => \text{DBL\_1st} < \\ LL\_RI(m-1) + \beta_{LLK2} \cdot \left[\frac{\min(L\_RI(m), L\_SI(m)) -}{LL\_RI(m-1)}\right] & \text{elseif} \quad \text{state} => \text{DBL\_2nd} < \\ LL\_RI(m-1) & \text{else} \quad \text{state} => \text{SI\_inactive} < \end{cases} \quad (17)$$

$$LL\_RO(m) = \begin{cases} LL\_RO(m-1) + \beta_{LL} \cdot [L\_RO(m) - LL\_RO(m-1)] & \text{if} \quad \text{state} => \text{adaptation} < \\ LL\_RO(m-1) + \beta_{LLK2} \cdot \left[\frac{\min(L\_RO(m), L\_RI(m)) -}{LL\_RO(m-1)}\right] & \text{elseif} \quad \text{state} => \text{DBL\_2nd} < \\ LL\_RO(m-1) & \text{else} \quad \text{state} => \text{SI\_inactive} < \\ & \text{or} \quad \text{state} => \text{DBL\_1st} < \end{cases} \quad (18)$$

LL_SI(m) stands for the output of the long-term level leaky integration filter LTL connected to the reference signal SI via a short-term level leaky integration filter STL in FIG. 5. LL_RI(m) stands for the output of the long-term level leaky integration filter LTL connected to the echo signal RI via a short-term level leaky integration filter STL. LL_RO(m) stands for the output of the long-term level leaky integration filter connected to the echo-cancelled signal RO via a short-term level leaky integration filter. A state control circuit is also provided in FIG. 5, which is used to detect double talk situations. A first double talk situation is represented by DBL_1st and a second double talk situation is indicated by DBL_2nd in the following equations. The output of the long-term leaky integration filters LTL is changed depending upon the detected double talk state. Therefore, the state control circuit is connected to the long-term leaky integration filters in FIG. 5. The first double talk situation DBL_1st is detected, if the following equation is true:

$$\frac{L\_SI(k)}{L\_RI(k)} < \frac{LL\_SI(m)}{LL\_RI(m)} \cdot DBL\_TH1 \text{ then } DBL\_1st \text{ active} \quad (19)$$

The second double talk situation DBL_2nd is detected, if the following equation holds:

$$\frac{L\_RI(k)}{L\_RO(k)} < \frac{LL\_RI(m)}{LL\_RO(m)} \cdot DBL\_TH2 \text{ then } DBL\_2nd \text{ active} \quad (20)$$

The state control double-talk is not connected to the filter coefficient update in FIG. 5. The filter coefficient update is not halted, if one of the two double talk situations DBL_1st or DBL_2nd is detected by the state control circuit in FIG. 5. DBL_TH1 and DBL_TH2 are constants, which determine the threshold for detecting a first and a second double talk situation.

Another control unit, which controls convergence speed and monitors adaptation blocking and divergence, is also shown in FIG. 5. The convergence or adaptation speed control block switches the control parameter α(m) for the adaptation speed of the adaptive filter algorithm, depending on the actual reached echo attenuation. The control parameter α(m) is reduced stepwise at programmable thresholds to improve the convergence behavior near the optimal filter coefficients. Very long, but in reality unlikely durations of a second double talk indication with a possible long blocking of the filter coefficient update have to be escaped after a timeout condition, since an abrupt system-change rather than a double-talk situation should be assumed. After divergence detection, where the adaptive filter even amplifies the echo, the echo canceller is restarted by resetting all filter coefficients to zero.

The measure of interference is calculated by the ERL-circuit and the norm select circuit shown in FIG. 5. The ERL-circuit stands for echo return loss-circuit. The output of the norm select circuit is given by the following equation:

$$W_{norm}(k) = \max[\|\vec{SI}(k)\|^2, w \cdot (ERL_T(m) \cdot L\_RO(k))^2] \quad (21)$$

The previous equation indicates, that either a first value equal to $\|\vec{SI}(k)\|^2$ is chosen or a second value equal to the weighted squared measure of interference is chosen depending on which value is greater. The norm select equation circuit receives the first value $\|\vec{SI}(k)\|^2$ and the second value of the previous equation and chooses which of the different values is output for filter coefficient update. The second term in the previous equation comprising the variables w, $ERL_T(m)$ and $L\_RO(k)$ is calculated by the ERL-circuit. m is a sub-sampled time index with respect to the normal time index k (sampling rate). $L\_RO(k)$ is the short-term level of the echo cancelled signal, $ERL_T(m)$ is a level ratio of the long-term levels $LL\_SI(m)$ and $LL\_RO(m)$ representing an estimation of the total achieved echo attenuation (total echo return loss) and w is a weighting constant.

$$ERL_T(m) = \frac{LL\_SI(m)}{LL\_RO(m)} \quad (22)$$

The filter coefficient update is carried out in FIG. 5 using the following equation:

$$\hat{h}_i(k+1) = \hat{h}_i(k) + \alpha(m) \cdot RO(k) \cdot \frac{1}{W_{norm}(k)} \cdot SI(k-i) \quad (23)$$

If the weighted squared measure of interference calculated by the ERL-circuit is smaller than $\|\vec{SI}(k)\|^2$ then the coefficient update is carried out according to the standard normalized least mean square algorithm (NLMS). Otherwise, the control of the step size Δĥ, with which the filter coefficients are updated, is done by the weighted squared measure of interference output from the ERL-circuit.

Simulations have shown, that the weighted squared measure of interference calculated by the ERL-circuit mainly corresponds to the reference signal norm $\|\vec{SI}(k)\|^2$ in the absence of interference. Therefore the adaptation speed during low levels of interference corresponds to the adaptation speed of the NLMS algorithm in the absence of double talk.

The main difference between the echo-canceling device of FIG. 5 and the echo-canceling device of the state of the art relates to different control during double talk situations. The double talk indications carried out by the state control circuit in FIG. 5 do not stop completely the adaptation of the filter coefficients. They only have an indirect effect, since they guarantee a reliable estimation of the total echo loss via a robust update of the long-term levels $LL\_SI(m)$ und $LL\_RO(m)$. The output of the ERL circuit comprises more and more the interference signal in a stronger way, which is acting automatically via the weighted norm selection on the adaptation speed. A strong rising level in the interference signal stops the adaptation nearly immediately, at least before the system significantly drifts away from the actual reached optimum.

Figure 6A:
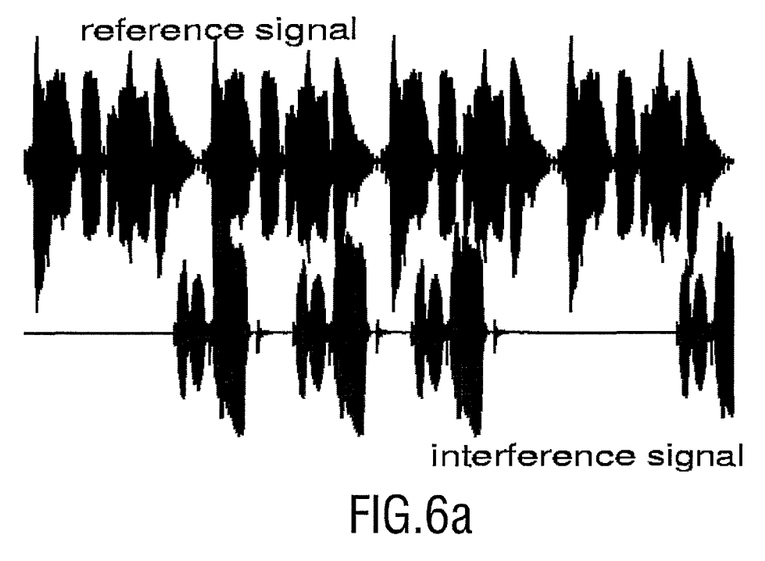
FIG. 6a shows a reference signal being echoed and an interference signal causing a double talk situation.
Figure 6B:
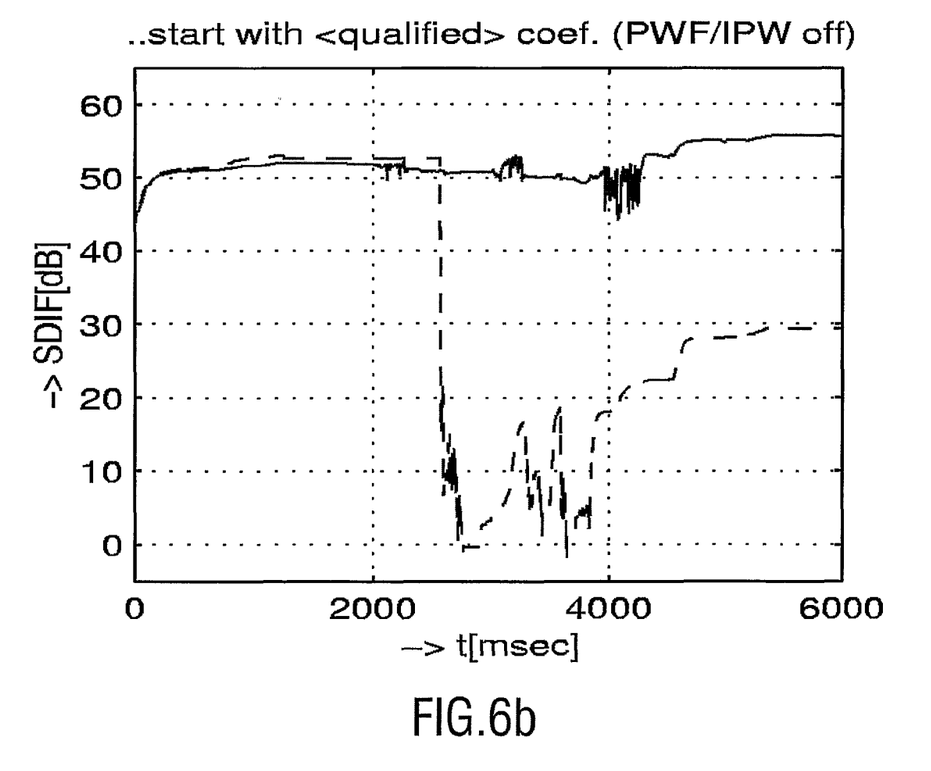
FIG. 6b shows a graph of the performance of the echo-canceling device according to the second embodiment, wherein pre-whitening filters and inverse pre-whitening filters of the second embodiment are turned off, in comparison with a performance of a conventional echo-canceling device.
Figure 6C:
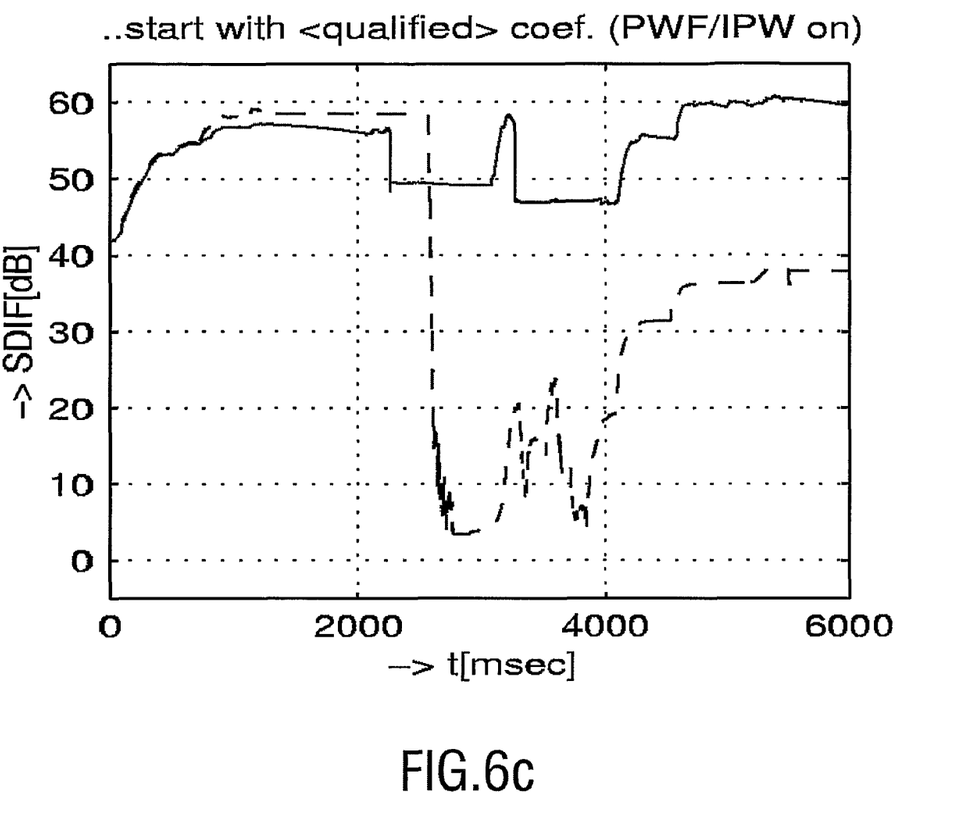
FIG. 6c shows a graph of the performance of the echo-canceling device of the second embodiment, wherein the pre-whitening filters and inverse pre-whitening filters are turned on in comparison with the performance of a conventional echo-canceling device.

FIGS. 6a, 6b and 6c show simulation examples, that clearly show the enhancements and a better performance of the echo canceling device of FIG. 5 in comparison with the known echo canceling device of FIG. 3. FIG. 6a shows a reference signal SI and an interference signal corresponding to the disturbing signal in FIGS. 5 and 3. These signals are used for testing the performance of the echo canceller of FIGS. 5 and 3. The performance is determined by the performance indicator SDIF(m). SDIF(m) is calculated by the following equation:

$$SDIF(m) = -10\log_{10}\left(\frac{\sum_{i=0}^{N-1}[\hat{h}(m,i) - h(i)]^2}{\sum_{i=0}^{N-1} h^2(i)}\right) \quad (24)$$

h(i) stands for the correct filter coefficients of the echo path. ĥ(i) stands for the filter coefficients being actually used by the FIR-filter. Therefore, SDIF is a logarithmic indication of the squared error of the current filter coefficients.

The dashed lines in FIGS. 6b and 6c represent the performance SDIF of the conventional echo-canceling device of FIG. 3 and continuous lines in FIGS. 6b and 6c represent the performance SDIF of the echo-canceling device of FIG. 5 according to the present invention. Both graphs 6b and 6c start with qualified coefficients. This means, that the circuits of FIGS. 5 and 3 are trained with reference signals for a certain amount of time before an interference signal is added. In FIG. 6b the pre-whitening filters and inverse pre-whitening filters PWF and IPW in the devices of FIGS. 5 and 3 are disabled and in FIG. 6c the pre-whitening filters and inverse pre-whitening filters of the circuits of FIGS. 5 and 3 are enabled. Both figures show, that the performance of the echo-canceling device according to the present invention is not strongly deteriorated by the onset of a disturbing interference signal.

The invention claimed is:

1. A method, comprising:
   receiving a first signal and a second signal, said second signal comprising an echo of the first signal;
   generating an echo replica signal by filtering the first signal with a finite impulse response filter, said finite impulse response filter using a filter coefficient vector for generating the echo replica signal;
   generating an echo canceled signal by subtracting the echo replica signal from the second signal;

determining a measure of interference within the second signal;
determining a step vector depending on said measure of interference, wherein an increasing measure of interference continuously reduces a size of the step vector and determining the step vector comprises:
generating a first step vector adapted to improve the filter coefficient vector, as if the second signal is not affected by interference;
generating a second step vector depending on said measure of interference; and
selecting the step vector from the first and second step vectors, wherein the selected step vector is the smallest of the first and second step vectors; and
updating the filter coefficient vector by the step vector.

2. The method according to claim 1 wherein the second step vector corresponds to the first step vector in the absence of interference on the second signal.

3. The method according to claim 2 wherein the second step vector continually decreases, if the measure of interference increases, such that the size of the second step vector becomes smaller than the size of the first step vector.

4. The method according to claim 1 wherein the measure of interference is determined using a level of the echo canceled signal.

5. The method according to claim 1 wherein the step vector is determined depending on a total echo return loss.

6. The method according to claim 5, comprising:
detecting whether a double talk situation is present; and
determining the total echo return loss differently depending on whether the double talk situation is present.

7. The method according to claim 5 wherein the measure of interference is determined using a weighted level of the echo canceled signal, said weighted level of the echo canceled signal consisting of the level of the echo canceled signal multiplied by the total echo return loss.

8. A device, comprising:
a finite impulse response filter adapted to receive a first signal and to output an echo replica signal, said finite impulse response filter using a filter coefficient vector for generating the echo replica signal;
a subtraction circuit for subtracting the echo replica signal from a second signal comprising an echo of the first signal;
a coefficient update circuit for iteratively updating the filter coefficient vector by a step vector;
means for determining a measure of interference within the second signal; and
means for determining the step vector depending on the measure of interference, wherein an increasing measure of interference continuously reduces a size of the step vector and the means for determining the step vector includes:
means for generating a first step vector adapted to improve the filter coefficient, as if the second signal is not affected by interference;
means for generating a second step vector depending on the measure of interference; and
means for selecting a smallest of the first and second step vectors as the determined step vector.

9. The device of claim 8 wherein the means for generating the second step vector is configured to continually decrease the second step vector when the measure of interference increases, such that the size of the second step vector becomes smaller than the size of the first step vector.

10. The device of claim 8 wherein the means for determining the measure of interference is configured to determine the measure of interference using a level of an echo canceled signal produced by the subtraction circuit.

11. The device of claim 8 wherein the means for determining the step vector comprises means for determining a total echo return loss.

12. The device of claim 11 wherein the means for determining the step vector comprises means for detecting a double talk situation and the means for determining the total echo return loss is configured to determine the total echo return loss differently depending on whether the double talk situation is detected.

13. The device of claim 11 wherein the means for determining the measure of interference is configured to determine the measure of interference using a weighted level of the echo canceled signal, said weighted level of the echo canceled signal consisting of the level of the echo canceled signal multiplied by the total echo return loss.

14. A device, comprising:
a finite impulse response filter configured to receive a first signal and to generate an echo replica signal using a filter coefficient vector;
a subtractor configured to subtract the echo replica signal from a second signal which is an echo of the first signal;
an interference measurer configured to generate an indication of interference within the second signal; and
a step vector generator configured to:
generate a first step vector as if the second signal is not affected by interference;
generate a second step vector depending on the generated indication of interference; and
select a smallest of the first and second step vectors; and
a coefficient updater configured to iteratively update the filter coefficient vector by the selected step vector, wherein coefficient updating continues when the indication indicates an increased level of interference.

15. The device of claim 14 wherein the step vector generator is configured to decrease the second step vector when the indication of interference increases, such that a size of the second step vector becomes smaller than a size of the first step vector.

16. The device of claim 14 wherein the interference measurer is configured to generate the indication of interference using a level of an echo canceled signal generated by the subtractor.

17. The device of claim 14 wherein the interference measurer is configured to determine a total echo return loss.

18. The device of claim 17 wherein the interference measurer is configured to detect double talk and to determine the total echo return loss differently depending on whether double talk is detected.

19. The device of claim 17 wherein the interference measurer is configured to generate the indication of interference using a weighted level of the echo canceled signal, said weighted level of the echo canceled signal consisting of the level of the echo cancelled signal multiplied by the total echo return loss.

20. The device of claim 14 wherein the step vector generator is configured, when the indication indicates a lack of interference, to generate a second step vector having a size which is not significantly smaller than a size of the first step vector.

21. A communication system, comprising:
a receive path;
a transmit path; and
an echo canceling device coupled to the receive path and the transmit path and having:

a finite impulse response filter configured to receive a first signal and to generate an echo replica signal using a filter coefficient vector;

a subtractor configured to subtract the echo replica signal from a second signal which is an echo of the first signal;

an interference measurer configured to generate an indication of interference within the second signal; and a step vector generator configured to:
  generate a first step vector as if the second signal is not affected by interference;
  generate a second step vector depending on the generated indication of interference; and
  select a smallest of the first and second step vectors; and a coefficient updater configured to iteratively update the filter coefficient vector by the selected step vector, wherein coefficient updating continues when the indication indicates an increased level of interference.

22. The system of claim 21 wherein the step vector generator is configured to decrease the second step vector when the indication of interference increases, such that a size of the second step vector becomes smaller than a size of the first step vector.

23. The system of claim 21 wherein the interference measurer is configured to generate the indication of interference using a level of an echo canceled signal generated by the subtractor.

24. The system of claim 21 wherein the step vector generator is configured to determine a total echo return loss.

25. The system of claim 24 wherein the step vector generator is configured to detect double talk and to determine the total echo return loss differently depending on whether double talk is detected.

26. The system of claim 24 wherein the interference measurer is configured to generate the indication of interference using a weighted level of the echo canceled signal, said weighted level of the echo canceled signal consisting of the level of the echo cancelled signal multiplied by the total echo return loss.

* * * * *